United States Patent
Alber

(10) Patent No.: US 9,528,375 B2
(45) Date of Patent: Dec. 27, 2016

(54) NON-UNIFORM BLADE DISTRIBUTION FOR ROTARY WING AIRCRAFT

(71) Applicant: Mark R. Alber, Milford, CT (US)

(72) Inventor: Mark R. Alber, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 692 days.

(21) Appl. No.: 13/689,941

(22) Filed: Nov. 30, 2012

(65) Prior Publication Data

US 2014/0154084 A1 Jun. 5, 2014

(51) Int. Cl.
*B64C 27/82* (2006.01)
*F01D 5/02* (2006.01)
*B64C 27/22* (2006.01)

(52) U.S. Cl.
CPC .............. *F01D 5/02* (2013.01); *B64C 27/22* (2013.01); *B64C 27/82* (2013.01); *B64C 2027/8236* (2013.01)

(58) Field of Classification Search
CPC .. B64C 11/48; B64C 2027/8236; B64C 27/22; B64C 27/82; F01D 5/02
USPC .................. 244/17.19; 416/198 R, 200 R
See application file for complete search history.

(56) References Cited

U.S. PATENT DOCUMENTS

| | | | | |
|---|---|---|---|---|
| 921,423 A | * | 5/1909 | Mackaness | 416/200 R |
| 1,868,008 A | * | 7/1932 | Gardner | 416/203 |
| 2,097,205 A | | 10/1937 | Cary et al. | |
| 2,368,698 A | * | 2/1945 | Young | B64C 27/82 244/17.13 |
| 3,222,012 A | * | 12/1965 | Piasecki | B64C 27/82 244/17.21 |
| 3,241,791 A | * | 3/1966 | Piasecki | B64C 27/82 244/17.19 |
| 3,540,680 A | * | 11/1970 | Peterson | B64C 27/82 244/17.19 |
| 3,830,587 A | * | 8/1974 | Shipes et al. | 415/130 |
| 4,514,146 A | * | 4/1985 | Nojiri et al. | 416/200 R |
| 4,676,459 A | * | 6/1987 | Seefluth | 244/65 |
| 4,726,547 A | * | 2/1988 | Zimmer | 244/17.11 |
| 4,905,932 A | * | 3/1990 | Piasecki | B64C 27/82 244/17.19 |
| 5,066,195 A | * | 11/1991 | Dobrzynski | 416/200 R |
| 5,096,383 A | * | 3/1992 | Dobrzynski | 416/200 R |
| 5,131,603 A | * | 7/1992 | Meyers | B64C 27/82 239/265.19 |
| 5,174,523 A | * | 12/1992 | Balmford | 244/17.11 |
| 5,383,767 A | * | 1/1995 | Aubry | 416/134 A |
| 5,738,301 A | * | 4/1998 | Francois | B64C 27/26 244/17.19 |

(Continued)

*Primary Examiner* — Valentina Xavier
*Assistant Examiner* — Steven Hawk
(74) *Attorney, Agent, or Firm* — Cantor Colburn LLP

(57) ABSTRACT

A translational thrust system for a rotary wing aircraft is provided including a propeller system. The propeller system includes more than one pair of propeller blades extending radially outward from a rotatable propeller hub. Each pair of propeller blades includes a first propeller blade and a second propeller blade arranged diametrically opposite one another about a circumference of the propeller hub. Each pair of propeller blades is arranged at an angle to an adjacent pair of propeller blades such that the angle is less than is the pairs of propeller blades were uniformly distributed around the circumference of the propeller hub.

16 Claims, 4 Drawing Sheets

(56) References Cited

U.S. PATENT DOCUMENTS

| | | | |
|---|---|---|---|
| 6,086,016 A * | 7/2000 | Meek | B64C 27/02 |
| | | | 244/17.11 |
| 6,098,921 A * | 8/2000 | Piasecki | B64C 27/14 |
| | | | 244/17.19 |
| 6,719,530 B2 | 4/2004 | Chow | |
| 7,434,764 B2 * | 10/2008 | Lappos et al. | 244/17.11 |
| 7,651,050 B2 * | 1/2010 | Lappos et al. | 244/17.11 |
| 7,942,365 B2 * | 5/2011 | Palcic et al. | 244/17.11 |
| 7,967,239 B2 * | 6/2011 | Cotton et al. | 244/17.19 |
| 8,336,808 B2 * | 12/2012 | Challis | B64C 27/22 |
| | | | 244/17.11 |
| 8,496,434 B2 * | 7/2013 | Brunken, Jr. | 416/114 |
| 8,500,062 B2 * | 8/2013 | Brunken, Jr. | 244/17.11 |
| 8,636,473 B2 * | 1/2014 | Brunken, Jr. | 416/114 |
| 8,640,983 B2 * | 2/2014 | Brunken, Jr. | 244/6 |
| 8,640,985 B2 * | 2/2014 | Brunken, Jr. | 244/39 |
| 2005/0151001 A1 * | 7/2005 | Loper | B64C 27/14 |
| | | | 244/6 |
| 2008/0237392 A1 * | 10/2008 | Piasecki | B64C 27/26 |
| | | | 244/6 |
| 2012/0305699 A1 * | 12/2012 | Cole | B64C 27/04 |
| | | | 244/17.21 |
| 2015/0152733 A1 * | 6/2015 | Moffitt | B64C 11/18 |
| | | | 416/1 |
| 2015/0246725 A1 * | 9/2015 | Reilly | B64C 27/605 |
| | | | 244/92 |

\* cited by examiner

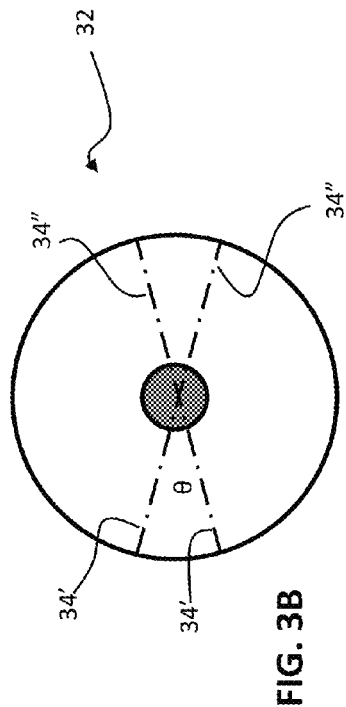
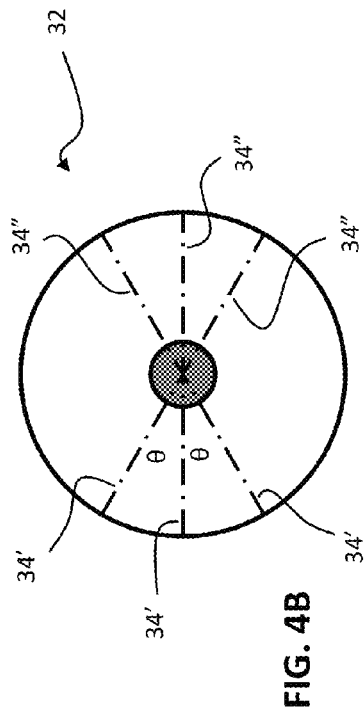
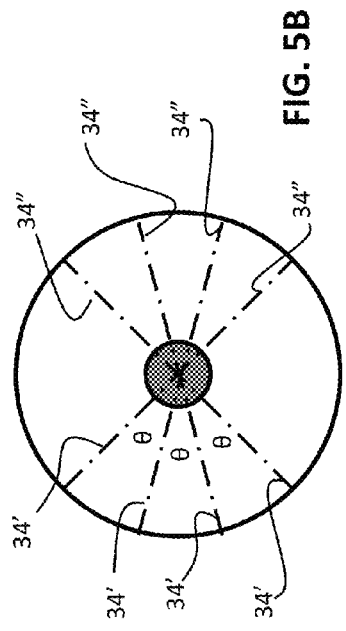
FIG. 3B
FIG. 4B
FIG. 5B
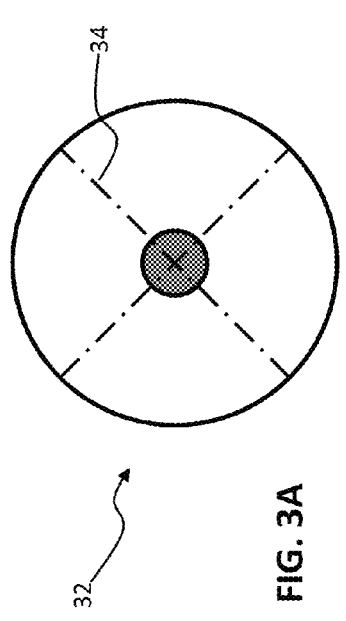
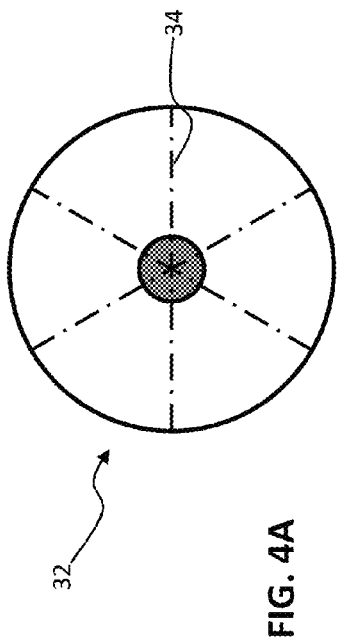
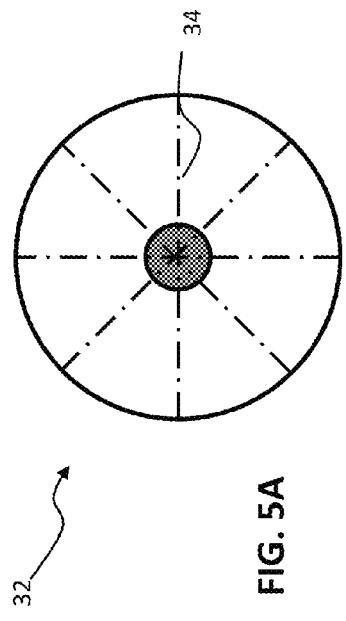
FIG. 3A
FIG. 4A
FIG. 5A

NON-UNIFORM BLADE DISTRIBUTION FOR ROTARY WING AIRCRAFT

BACKGROUND OF THE INVENTION

Exemplary embodiments of the invention relate to a rotary wing aircraft, and more particularly, to a translational thrust system of a rotary wing aircraft.

A rotary wing aircraft with a coaxial contra-rotating rotor system is capable of higher speeds compared to conventional single rotor helicopters due in part to the balance of lift between the advancing sides of the main rotor blades on the upper and lower rotor systems. To still further increase airspeed, supplemental translational thrust is provided by a translational thrust system, such as a propeller system oriented substantially horizontally and parallel to the aircraft longitudinal axis to provide thrust for high-speed flight. Conventional propeller systems include a plurality of propeller blades uniformly spaced about a central rotatable hub.

The airspeed is further increased by increasing the thrust generated by the translational thrust system. The thrust generated by the propeller system of the translational thrust system may be amplified by increasing the propeller blade surface area, either by adding more blades to the propeller system or by increasing the size of the blades of the propeller system, i.e. increasing the diameter of the propeller disk. The diameter of the propeller disk, however, is restricted by the location of the lower rotor as well as the clearance with the ground.

BRIEF DESCRIPTION OF THE INVENTION

According to one embodiment of the invention, a translational thrust system for a rotary wing aircraft is provided including a propeller system. The propeller system includes more than one pair of propeller blades extending radially outward from a rotatable propeller hub. Each pair of propeller blades includes a first propeller blade and a second propeller blade arranged diametrically opposite one another about a circumference of the propeller hub. Each pair of propeller blades is arranged at an angle to an adjacent pair of propeller blades such that the angle is less than if the pairs of propeller blades were uniformly distributed around the circumference of the propeller hub.

According to another embodiment of the invention, a rotary wing aircraft is provided including an airframe and at least one rotor system. The rotary wing aircraft also has a propeller system mounted to a tail end of the airframe. The propeller system includes more than one pair of propeller blades extending radially outward from a central rotatable hub. Each pair of propeller blades is arranged at an angle to an adjacent pair of propeller blades such that the angle is less than if the pairs of propeller blades were uniformly distributed around a circumference of the propeller hub. A first vertical clearance exists between the propeller hub and the rotor system and a second vertical clearance exists between the propeller hub and a surface below the rotary wing aircraft. When stopped in the proper location, the second vertical clearance is smaller than first vertical clearance.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3A is a front view of a known propeller system having four uniformly distributed propeller blades;

FIG. 3B is a front view of a propeller system having four propeller blades according to an embodiment of the invention;

FIG. 4A is a front view of a known propeller system having six uniformly distributed propeller blades;

FIG. 4B is a front view of a propeller system having six propeller blades according to an embodiment of the invention;

FIG. 5A is a front view of a known propeller system having eight uniformly distributed propeller blades; and FIG. 5B is a front view of a propeller system having eight propeller blades according to an embodiment of the invention.

The detailed description explains embodiments of the invention, together with advantages and features, by way of example with reference to the drawings.

DETAILED DESCRIPTION OF THE INVENTION

Figure 1A:
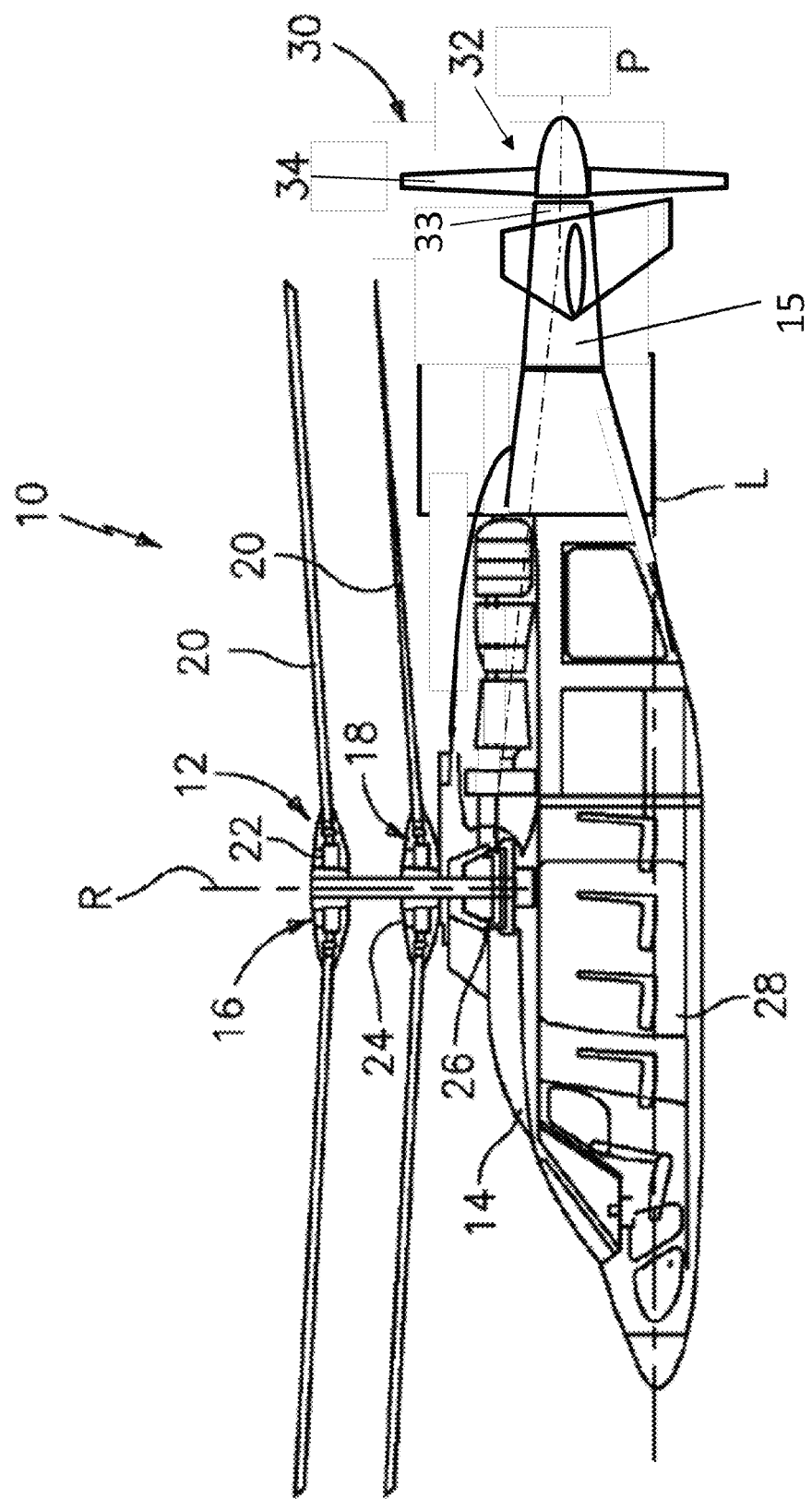
FIGS. 1A and 1B are general side and top views of an exemplary rotary wing aircraft for use with embodiments of the invention.
Figure 1B:
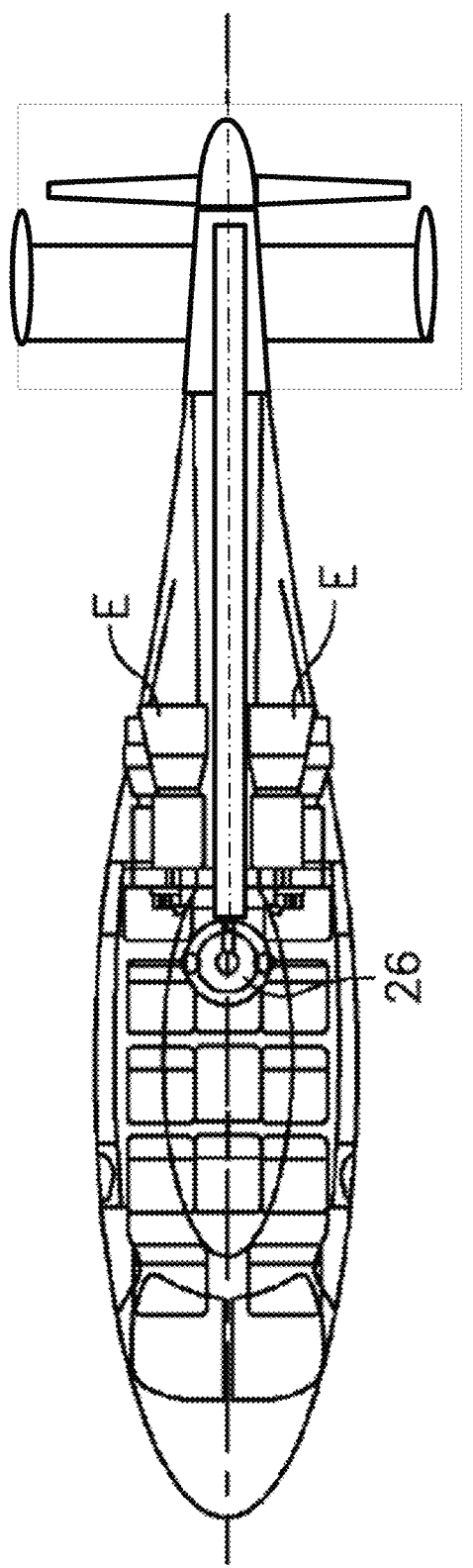

FIGS. 1A and 1B illustrate an exemplary vertical takeoff and landing (VTOL) high speed compound or coaxial contra-rotating rigid rotor aircraft 10 having a dual, contra-rotating main rotor system 12, which rotates about a rotor axis of rotation R. The aircraft includes an airframe 14 which supports the dual, contra-rotating, coaxial main rotor system 12 as well as a translational thrust system 30 which provides translational thrust generally parallel to an aircraft longitudinal axis L.

The main rotor system 12 includes a first rotor system 16 and a second rotor system 18. Each rotor system 16, 18 includes a plurality of rotor blades 20 mounted to a respective rotor hub 22, 24. The main rotor system 12 is driven by a main gearbox 26. The translational thrust system 30 may be any propeller system including, but not limited to a pusher propeller, a tractor propeller, a nacelle mounted propeller, etc. The illustrated translational thrust system 30 includes a pusher propeller system 32 with a propeller rotational axis P oriented substantially horizontal and parallel to the aircraft longitudinal axis L to provide thrust for high speed flight. The translational thrust system 30 may alternatively or additionally include side mounted thrusters, forward mounted thrusters or other prop or jet powered systems separate from the main rotor system 12. The illustrated embodiment mounts the propeller system 32 within an aerodynamic cowling 33 at the rear of the airframe 14. The translational thrust system 30 may be driven through the main gearbox 26 which drives the rotor system 12.

The main gearbox 26 is driven by one or more engines, illustrated schematically at E. In the case of a rotary wing aircraft, the gearbox 26 may be interposed between one or more gas turbine engines E, the main rotor system 12 and the translational thrust system 30. In one embodiment, the main gearbox 26 is a split torque gearbox which carries torque from the engines E through a multitude of drivetrain paths. Although a particular rotary wing aircraft configuration is illustrated and described in the disclosed non-limiting embodiment, other configurations and/or machines with translational thrust systems are within the scope of the present invention.

Figure 2:
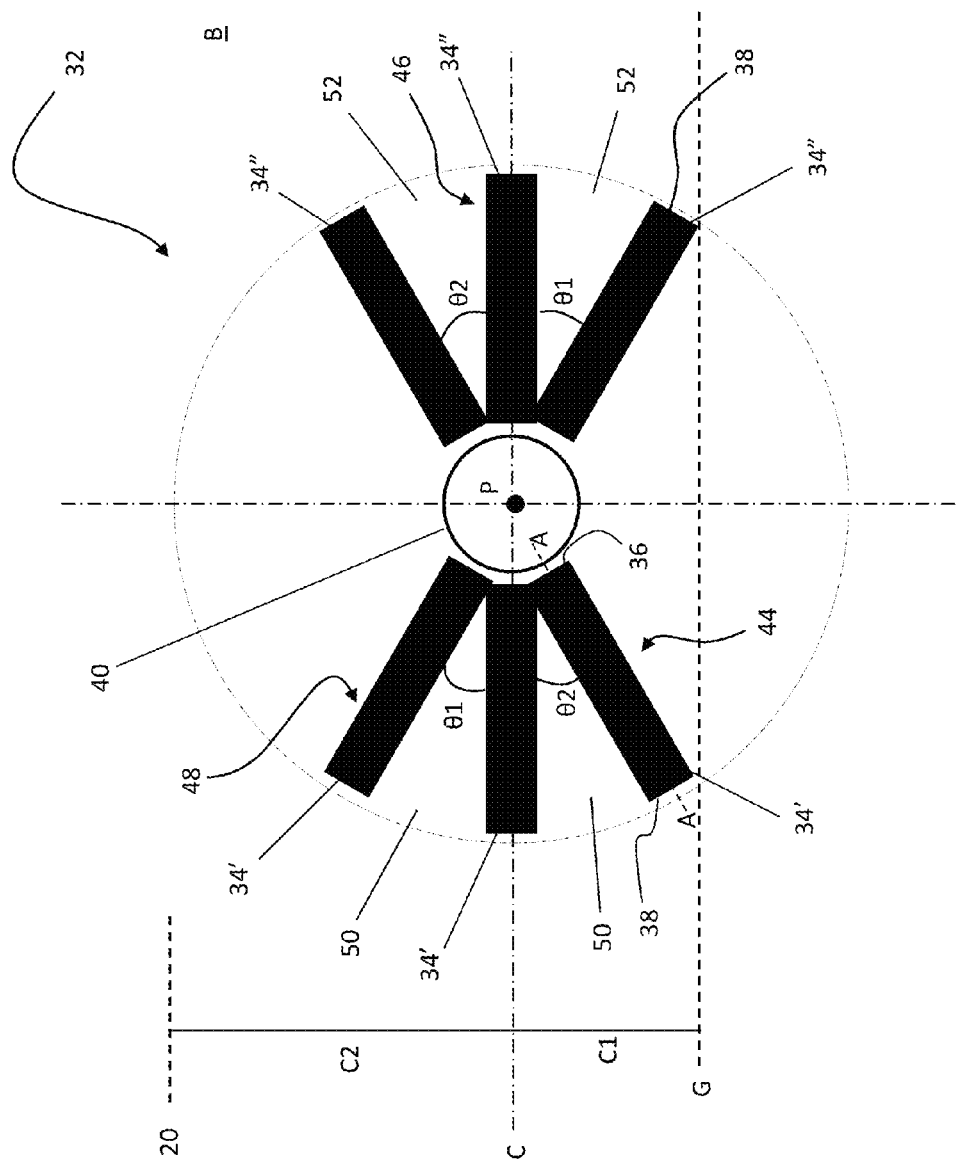
FIG. 2 is front view of a stopped propeller system according to embodiments of the invention.

Referring now to FIG. 2, the propeller system 32 of the translational thrust system 30 is illustrated in more detail. The propeller system 32 generally includes a plurality of propeller blades 34 individually mounted at a first end 36 to a central propeller hub 40. The propeller hub 40 is configured to rotate about the rotational axis P. The second end 38 of each blade 34 is positioned such that the plurality of blades 34 extends radially outward from the propeller hub 40 within a plane B. Plane B is oriented substantially perpendicularly to the rotational axis P of the propeller hub 40. In one embodiment, the propeller system 32 is a variable pitch system such that each propeller blade 34 is rotatable relative to the hub 40 about a longitudinal axis A extending between the first end 36 and the second end 38 of the blade 34. The propeller system 32 is mounted to the tail end 15 of the rotary wing aircraft 10 such that a first vertical clearance C1 exists between the ground G and the center of the propeller hub 40 and a second vertical clearance C2 exists between the hub 40 and the lower rotor 20 of the main rotor system 12. In one embodiment the propeller system 32 is mounted to the tail end 15 such that the second clearance C2 is larger than the first clearance C1.

The propeller system 32 includes any even number of blades 34 greater than or equal to four blades 34. For example, the propeller system 32 illustrated in FIG. 2 includes six blades 34. The plurality of blades 34 are arranged in pairs 44, 46, 48 about the circumference of the propeller hub 40. Each pair 44, 46, 48 includes a first propeller blade 34' and the second propeller blade 34" mounted diametrically opposite, or antipodal, one another about the propeller hub 40. In one embodiment, the plurality of first propeller blades 34' and the plurality of second propeller blades 34" are substantially identical. The pairs 44, 46, 48 are oriented such that all of the first propeller blades 34' are mounted near one another, such as adjacent a first portion of the propeller hub 40. The plurality of second propeller blades 34" are similarly mounted adjacent one another near a second, opposite portion of the hub 40.

Each pair 44, 46, 48 is arranged at an angle θ to an adjacent pair 44, 46, 48 such that a space 50 exists between adjacent first propeller blades 34' and therefore a similar space 52 is positioned between adjacent second propeller blades 34". In embodiments having three or more pairs 44, 46, 48 of blades 34, the angles θ formed between each set of adjacent first propeller blades 34' or between each set of adjacent second propeller blades 34" are equal, such that the pairs 44, 46, 48 are equally spaced from one another. For example, the angle θ1 formed between the first blade 34' of pair 44 and the first blade 34' of the second pair 46 is equal to the angle θ2 formed between and the first blade 34' of the second pair 46 and the first blade 34' of the third pair 48. In one embodiment, the pairs 44, 46, 48 of propeller blades 34, 34' are non-uniformly distributed about the circumference of the propeller hub 40. The pairs 44, 46, 48 are arranged such that the angle θ formed between adjacent first propeller blades 34' and adjacent second propeller blades 34" is smaller than if the blades 34', 34" were uniformly distributed about the circumference of the propeller hub 40.

Conventional propeller systems 32 and propeller systems 32 according to an embodiment of the invention having the same number of propeller blades 34 are illustrated side by side in FIGS. 3-5. FIG. 3A illustrates a propeller 32 having four uniformly distributed propeller blades 34, spaced ninety degrees apart from each other. The propeller system 32 illustrated in FIG. 3B, however, has two pairs of non-uniformly distributed propeller blades 32. Though the adjacent first blades 34' are illustrated at an angle θ of thirty degrees from one another, the first blades 34' may be arranged at any angle greater than zero and less than ninety degrees. Similarly, the propeller system 32 of FIG. 4A has six uniformly distributed blades 34 and the propeller system 32 illustrated in FIG. 4B has three pairs of non-uniformly distributed blades 34. As illustrated, the first blades 34' are arranged at a thirty degree angle to one another, however, the first blades 34' may be arranged at any angle θ greater than zero and less than sixty degrees. Referring now to FIG. 5A, the propeller system 32 includes eight uniformly distributed blades 34 arranged at forty five degrees to one another. Though the first blades 34' of the propeller system 32 illustrated in FIG. 5B are illustrated at a 30 degree angle to one another, the first blades 34' may be arranged at any angle θ greater than zero and less than 45 degrees to one another.

The angle θ between the plurality of non-uniformly distributed first propeller blades 34' and second propeller blades 34" is in the range of about 25 degrees to about 35 degrees. In one embodiment, the angle θ is about 30 degrees. Such an arrangement of a propeller system 32 having six blades 34 allows for a substantial increase of the size of each blade 34, and therefore the diameter of the propeller system 32. Alternatively, the angle θ between adjacent first propeller blades 34' and adjacent second propeller blades 34" may be less than 30 degrees. The angle θ for a propeller system 32 having non-uniformly distributed blades 34 will depend on several factors including, but not limited to, the chord of the propeller blades 34, the shape of the blades 34, the geometry of the blades 34 at the root or first end 36, and the clearance of the blades 34 which the pitch is varied.

In one embodiment, when the propeller system 32 is non-operational, the propeller system 32 is indexed, or centered about a horizontal axis C parallel to the ground G. By indexing the stopped non-uniformly distributed propeller blades 34, a space exists between the second ends 38 of the blades 34 and the ground G when the rotary wing aircraft 10 is stationary. Consequently, the propeller hub 40 may be repositioned such that ends 38 are adjacent the ground G (FIG. 2), thereby increasing the vertical clearance C2 between the lower rotor 20 and the hub 40. Because the maximum length of the propeller blades 34 is determined by this clearance C2, the blades 34 of the disclosed propeller system 32 are larger than conventional systems, generate more thrust, and allow the rotary wing aircraft 10 to travel faster for a given power.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A translational thrust system for a rotary wing aircraft comprising:
   a propeller system having at least a first pair of propeller blades and a second pair of propeller blades extending radially outward from a rotatable propeller hub, wherein each pair of propeller blades includes a first propeller blade and a second propeller blade arranged diametrically opposite one another about a circumference of the propeller hub, and the first pair of propeller blades and the second pair of propeller blades are arranged such that an angle between a first propeller blade of the first pair of propeller blades and a first propeller blade of the second pair of propeller blades is less than if the first and second pairs of propeller blades were uniformly distributed around the circumference of the propeller hub, wherein the first pair of propeller blades and the second pair of propeller blades are configured to rotate to an indexed position when the rotary wing aircraft is grounded, and a distance between a rotational axis of the propeller hub and a surface on which the rotary wing aircraft is supported when the rotary wing aircraft is grounded is less than a length of one of the propeller blades.

2. The translational thrust system according to claim 1, wherein the first propeller blade and the second propeller blade of each pair are substantially identical.

3. The translational thrust system according to claim 1, wherein the propeller system includes at least two pairs of propeller blades, and the angles formed between each pair of adjacent first propeller blades are generally equal.

4. The translational thrust system according to claim 1, wherein the pairs of propeller blades are indexed about a horizontal axis such that when the hub is stationary a clearance exists between the propeller blades and the surface on which the aircraft is supported.

5. The translational thrust system according to claim 1, wherein the propeller system is a pusher propeller system.

6. The translational thrust system according to claim 1, wherein the first propeller blades and the second propeller blades are arranged within a plane.

7. The translational thrust system according to claim 6, wherein each first propeller blade and each second propeller blade is configured to rotate within the plane relative to the hub.

8. A rotary wing aircraft comprising:
   an airframe;
   at least one rotor system;
   a propeller system mounted to a tail end of the air frame, the propeller system including at least a first pair of propeller blades and a second pair of propeller blades extending radially outward from a central rotatable hub, the first pair of propeller blades and the second of propeller blades are arranged such that an angle between a first propeller blade of the first pair of propeller blades and a first propeller blade of the second pair of propeller blades is less than if the first and second pairs of propeller blades were uniformly distributed around a circumference of the propeller hub;
   wherein a first vertical clearance exists between the hub and the rotor system, and a second vertical clearance exists between the hub and a surface below the rotary wing aircraft, the first vertical clearance being larger than the second vertical clearance, wherein the second vertical clearance is less than a length of one of the propeller blades.

9. The rotary wing aircraft according to claim 8, wherein each pair of propeller blades includes a first propeller blade and a second propeller blade mounted diametrically opposite one another about the hub.

10. The rotary wing aircraft according to claim 9, wherein the first propeller blade and the second propeller blade of each pair are substantially identical.

11. The rotary wing aircraft according to claim 9, wherein a length of each first propeller blade and each second propeller blade is about equal to the first vertical clearance.

12. The rotary wing aircraft according to claim 9, wherein the propeller system includes at least two pairs of propeller blades, and the angles formed between each pair of adjacent first propeller blades are generally equal.

13. The rotary wing aircraft according to claim 8, wherein the pairs of propeller blades are indexed about a horizontal axis, parallel to the surface below the rotary wing aircraft, when the rotary wing aircraft is stationary.

14. The rotary wing aircraft according to claim 8, wherein the propeller system is a pusher propeller system.

15. The rotary wing aircraft according to claim 9, wherein the first propeller blades and the second propeller blades are arranged within a plane.

16. The rotary wing aircraft according to claim 15, wherein each first propeller blade and each second propeller blade is configured to rotate within the plane relative to the hub.

* * * * *